United States Patent [19]

Canter

[11] Patent Number: 5,751,140
[45] Date of Patent: May 12, 1998

[54] VOLTAGE CONVERTER WITH BATTERY DISCHARGE PROTECTION

[75] Inventor: Stanley Canter, Phoenix, Ariz.

[73] Assignee: Space Systems/Loreal, Inc., Palo Alto, Calif.

[21] Appl. No.: 823,825

[22] Filed: Mar. 25, 1997

[51] Int. Cl.$^6$ ........................................ G05F 1/56
[52] U.S. Cl. ........................................ 323/282
[58] Field of Search ........................ 323/222, 265, 323/266, 282, 285

[56] References Cited

U.S. PATENT DOCUMENTS

| | | | |
|---|---|---|---|
| 3,733,535 | 5/1973 | Ballman | 323/282 |
| 5,359,280 | 10/1994 | Canter et al. | 323/282 |
| 5,397,976 | 3/1995 | Madden et al. | 323/222 |
| 5,493,203 | 2/1996 | Dalton | 323/282 |

Primary Examiner—Matthew V. Nguyen
Attorney, Agent, or Firm—Perman & Green, LLP

[57] ABSTRACT

An electric power regulator circuit for discharge of a spacecraft battery is employed for powering a load with energy stored in the battery. In order to produce a simplification of circuitry with reduction in the total number of components, the regulator circuit has two loops which share a common inductor. In a first loop, the inductor is serially connected with a gate, in the form of a first field effect transistor (FET) connected to the battery. The second loop includes the inductor with a series connection via a diode or a second FET to a capacitor which charges to feed the load. The load is serially connected via a current monitor between terminals of the capacitor, the monitor serving to sense the presence of short circuit current. The first FET is pulse-width modulated by a modulator operating in response to voltage sensed across the capacitor. The pulse width duty factor is adjusted automatically to compensate for changes in capacitor voltage, thereby to establish an essentially constant value of voltage. The second FET is operated in complementary fashion to the first FET. The forward conduction direction of the diode is opposed to the direction of current flow through the battery to insure that there is no flow of current through the battery in the event of a short circuit.

11 Claims, 2 Drawing Sheets

VOLTAGE CONVERTER WITH BATTERY DISCHARGE PROTECTION

BACKGROUND OF THE INVENTION

This invention relates to a power supply circuit providing electric power at a regulated voltage from a battery, such as a spacecraft battery, having a lower voltage, wherein the circuit provides a short circuit protection to the battery while employing a reduced number of circuit components.

Batteries are employed in numerous electric circuits for powering a load in situations wherein an alternate source of power, such as power lines from an electric power company, is not available. A situation of particular interest herein is the powering of electric circuitry carried by a spacecraft. It is the practice to provide a spacecraft with solar panels to convert solar energy to electric energy. The resulting electric energy is stored in a battery on board the spacecraft for use at times when the electric power demand of spacecraft circuits may exceed the power provided by the solar panels.

In the powering of an electric load, the battery is discharged via a regulator circuit. The regulator circuit provides plural functions of conversion of battery voltage to another voltage level, typically a higher voltage, and protection of the battery against a short circuit in the load.

A problem arises in that existing regulator circuits for the discharge of a battery for powering a load are unduly complex and/or overly large and heavy. This is disadvantageous for use in a spacecraft wherein it is desirable to minimize weight and complexity of electric circuits.

SUMMARY OF THE INVENTION

The aforementioned problem is overcome and other advantages are provided by a power regulator circuit, useful in powering a load from a battery wherein, in accordance with the invention, the circuit comprises a first loop of circuit elements and a second loop of circuit elements which share a common inductor. The first loop is composed of a series interconnection of the battery, a gate and the inductor. The second loop is composed of a series interconnection of the inductor with a diode and a capacitor. A load to be powered by the circuit is connected in parallel to the capacitor. The gate is operated by a pulse train signal outputted by a pulse width modulator for opening and closing a current path between the battery and the coil.

In accordance with a feature of the invention, the diode is connected with its forward direction of current flow in opposition to a flow of current from the battery. Thereby, in the event of a short circuit at the load, a flow of battery current to the load is blocked by the diode. The pulse-width modulator is operated in a feedback circuit, such as a circuit employing a sensor of the load voltage, to vary the pulse duty factor for maintaining a desired load voltage independently of current drawn by the load. A current monitor may be placed in series with the load to sense the presence of a short circuit or excessive current flow. In the event of the excessive current flow, the monitor signals the modulator to maintain the gate in an opened condition, thereby to prevent flow of additional power to the load.

In a preferred embodiment of the invention, the gate is fabricated as a field effect transistor (FET), the modulator is connected between a source terminal and a gate terminal of the FET, and a drain terminal of the FET is connected to a first terminal of the battery. The source terminal of the FET is connected via the inductor to a second terminal of the battery. Also, if desired, the diode may be replaced with a second FET operating in the manner of a diode. Preferably, the gate of the second FET is operated in synchronism with the gate of the first FET, but with an inverter circuit between the two gates so as to provide for complementary operation of the two FET'S. The capacitor serves to receive the electric current pulses for storing energy of the pulses, thereby to provide for a substantially constant voltage output to the load even though the energy from the current is provided in pulses. The inductance of the inductor and the capacitance of the capacitor establish a resonant frequency for the power regulator circuit, this resonant frequency being much lower, by at least approximately a factor of 10, than the frequency of the pulse width modulation. Thereby, the inductor and the capacitor are able to filter the current pulses to provide for a steady voltage appearing across the capacitor and the load connected in parallel therewith. This circuit configuration provides reliability and a substantial decrease in the number of electrical components from previously available circuitry.

BRIEF DESCRIPTION OF THE DRAWING

The aforementioned aspects and other features of the invention are explained in the following description, taken in connection with the accompanying drawings wherein.

DETAILED DESCRIPTION

Figure 1:
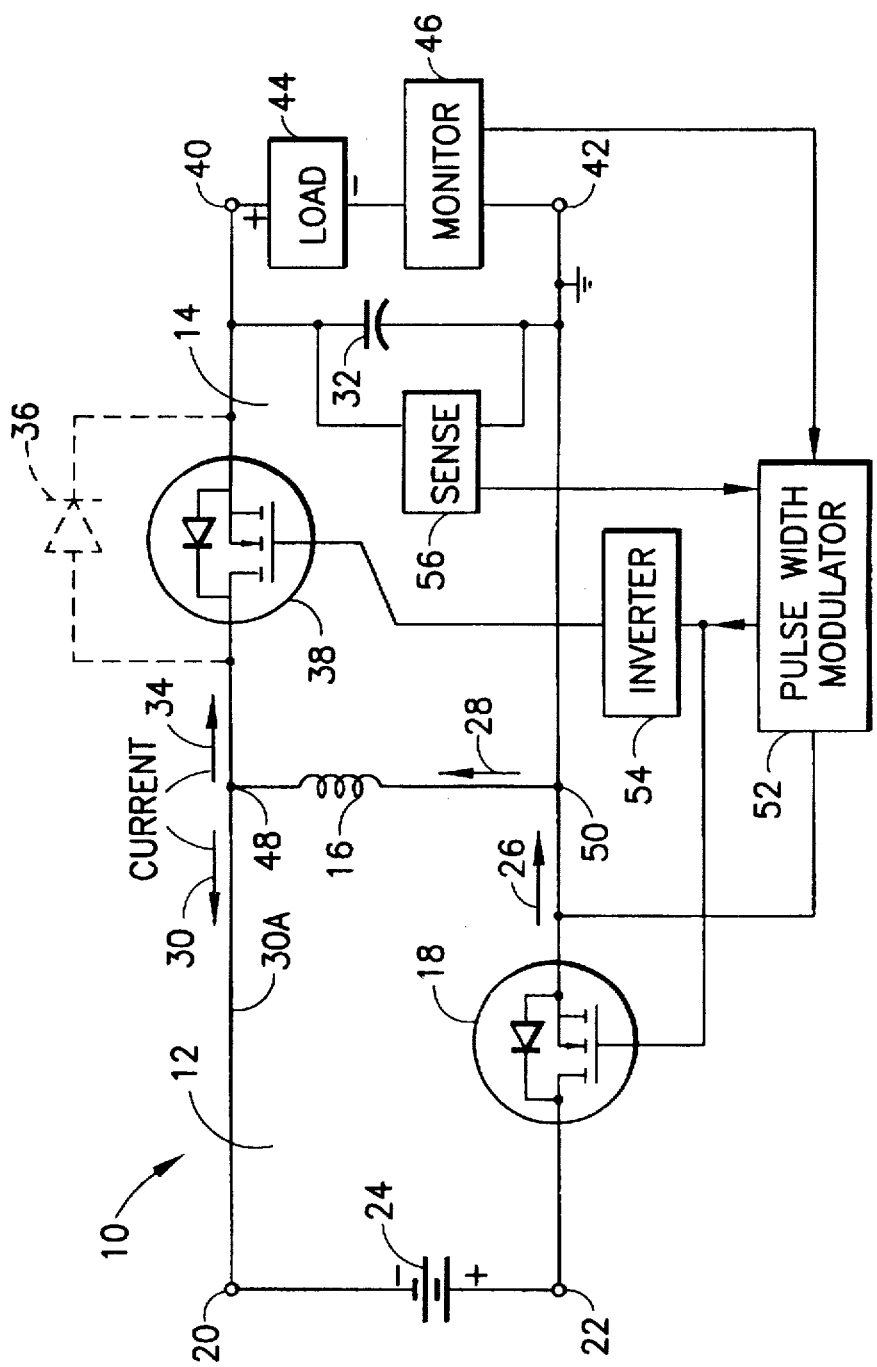
FIG. 1 shows an electrical schematic drawing, partly in block diagrammatic form, of the power regulator circuit of the invention.

With reference to the drawing, there is shown a power regulator circuit 10 which is constructed in accordance with the invention, and includes a first circuit loop 12 and a second circuit loop 14. The regulator circuit 10 includes further an inductor 16 which is a common branch of both the first loop 12 and the second loop 14. Also included within the first loop 12 is a first FET 18 and a pair of input terminals 20 and 22 for connection with a battery 24, such as the battery of a spacecraft. The battery 24 has positive and negative terminals arranged to direct current, indicated by the arrows 26, 28, and 30 in a counter clockwise direction through circuit branches of the first loop 12. These circuit branches of the first loop 12 include the FET 18, the inductor 16, and a conductor 30A which interconnects the inductor 16 to the input terminal 20. This current flows during a state of conduction of the FET 18, and is terminated during a state of nonconduction of the FET 18.

The second loop 14 includes, in addition to the inductor 16, a capacitor 32 and a circuit element for constraining current flow within the second loop 14 to flow in a clockwise direction as indicated by the arrows 28 and 34. The circuit element for maintaining the unidirectional flow of current may be a diode 36, indicated in phantom, or a second FET 38 which is employed in the preferred embodiment of the invention. The second loop 14 is provided with a pair of output terminals 40 and 42 which connect with opposed terminals of the capacitor 32, and also serve for connection of a load 44 to the regulator circuit 10. It is advantageous to connect the load 44 between the output terminals 40 and 42 by means of a current monitor 46 which provides a measure of load current for a purpose to be described below.

As noted above, the counterclockwise current of the first loop 12 flows through the battery 24, the FET 18 and the inductor 16 back to the battery 24. The clockwise current in the second loop 14 flows via the inductor 16 and the second FET 38 via the capacitor 32 back to the inductor 16. Upon connection of the load 44 and the monitor 46 serially between the output terminals 40 and 42, the clockwise current of the second loop 14 flows also through the load 44. As shown at a node 48, at the point of interconnection of the inductor 16, the conductor 30A and the second FET 38, the inductor current, represented by the arrow 28, flows out of the node 48 in the opposed directions indicated by the arrow 30 and the arrow 34. In accordance with a feature of the invention, the unidirectional constraint of current flow in the second loop 14, as provided by either the diode 36 or the FET 38, serves to protect the battery 24 from an excessive current discharge by blocking such a discharge current, as might otherwise occur in the event of a failure of the regulator circuit 10.

In the construction of the regulator circuit 10, each of the FET's 18 and 38 operate in the enhancement mode. The source terminal of the FET 18 connects via node 50 to the inductor 16, and the drain terminal of the FET 38 connects via the battery 24 and the node 48 to the inductor 16. The drain terminal of the FET 38 connects via the node 48 to the inductor 16. The source terminal of the FET 38 connects via the load 44 and the node 50 to the inductor 16. The gate terminal of the first FET 18 connects directly to a first output terminal of a pulse width modulator 52, and the gate terminal of the second FET 38 connects via an inverter circuit 54 to the first output terminal of the modulator 52. A second output terminal of the pulse-width modulator 52 connects with the node 50. Voltage appearing across the capacitor 32 is sensed by a sensor 56, and applied via the sensor 56 to an input terminal of the modulator 52. There is no more than an negligibly small voltage drop across the current monitor 46 and, accordingly, the voltage sensed by the sensor 56 is equal substantially to the voltage across the load 44. The magnitude of current flowing through the load 44, as measured by the monitor 46, is applied to a further input terminal of the modulator 52.

In the operation of the regulator circuit 10, the modulator 52 provides a succession of rectangular pulses, at a predetermined modulation frequency, to the gate terminal of the first FET 18, and via the inverter 54 to the gate terminal of the second FET 38. During termination of conduction in the first FET 18, the current in the inductor 16 proceeds to flow via the second FET 38 to charge the capacitor to the desired voltage. The modulator 52 operates with a modulation frequency which is substantially greater, such as by at least approximately a factor of 10, than a resonant frequency of the regulator circuit 10 established by the product of the inductance of the inductor 16 and the capacitance of the capacitor 32. This provides for filtering of pulsations of current, resulting from the modulation operation, to produce a substantially constant value of voltage across the capacitor 32. The signal outputted by the sensor 56 directs the modulator 52 to increase or to decrease the duty cycle of the modulation so as to provide for an average value of current from the discharge of the battery 24 which meets the current demand of the load 44, thereby to maintain the desired voltage across the capacitor 32 and, equivalently, across the load 44. The measure of current provided by the monitor 46 is compared to a threshold within the monitor 46 to determine if the current is excessive, this indicating a failure of the regulator circuit 10. Upon an indication of the excessive current flow, the monitor 46 signals the modulator 52 to place the FET 18 in a state of nonconduction, thereby to terminate further discharge of the battery 24.

In the operation of the regulator circuit 10, a pulse of battery current, generated by the placing of the FET 18 in a state of conduction, passes through the inductor 16 back to the battery 24, but is precluded from passing concurrently into the capacitor 32 because of blockage by either the diode 36 or the FET 38 which is then in a state of nonconduction. Upon termination of the current pulse from the battery 24, this occurring upon a placing of the FET 18 in a state of nonconduction as noted above, the current in the inductor 16 is maintained by flowing into the second loop 14, such current flow being enabled by the forward current direction of the diode 36 or by the FET 38 which is then in a state of conduction. In this way, magnetic energy within the inductor 16, built up by circulation of current within the first loop 12, is then transferred into the capacitor 32 and the load 44 by subsequent flow of the current from the inductor 16 into the second loop 14. The amount of the average value of the current increases with an increasing duty factor, and decreases with a decreasing value of the duty factor. Thereby, the modulator 52 is able to control the output voltage across the capacitor 32 and the load 44 in response to a sensing of the voltage across the sensor 56.

Figure 2:
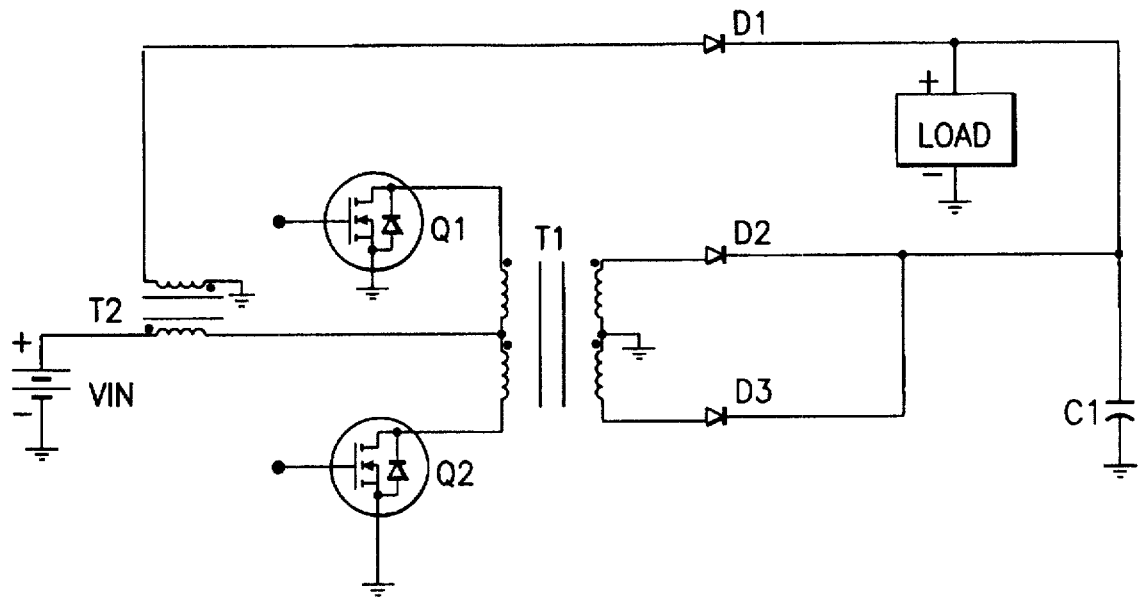
FIGS. 2 and 3 show power regulator circuits of the prior art.
Figure 3:
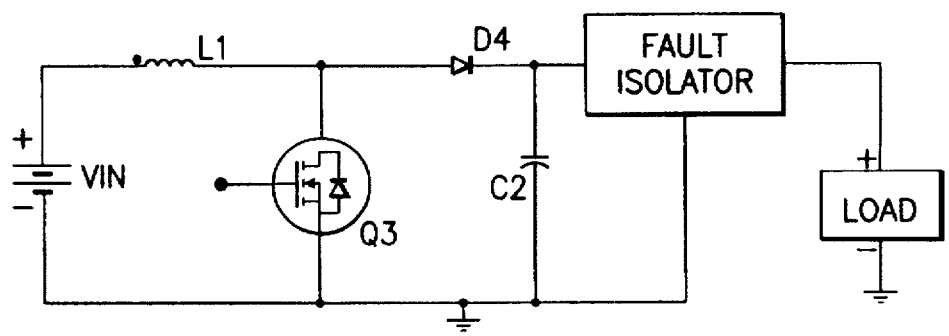

The benefits of the invention can be understood further by comparison of the circuitry of the invention with that of the prior art circuits disclosed in FIGS. 2 and 3.

In FIG. 2, there is shown a simplified circuit of a power regulator employed on a spacecraft for coupling stored electric energy in a battery to a load. The circuit of FIG. 2 comprises three diodes D1, D2, and D3, two transistors Q1 and Q2, and two transformers T1 and T2. The transistors Q1 and Q2 are driven by a pulse-width modulator (not shown in FIG. 2 to simplify the drawing) to provide pulsations of electric current which enable coupling of electric current from a primary winding in each of the transformers T1 and T2 whereby current is outputted from the transformer T2 by diode D1 to the load, and by transformer T1 via the diodes D2 and D3. The three diodes D1, D2, and D3 are coupled to a common terminal of an output capacitor C1 which is connected in parallel to the load. The pulsations of electric current in the transformers T1 and T2 are directed via the diodes D1, D2, and D3 to charge the capacitor C1 to a desired voltage, and to store electric energy within the capacitor C1 for operation of the load. It is noted that there is no direct connection between the load and the battery, all connections being made by magnetic coupling through the transformers T1 and T2. Accordingly, in the event of a short circuit occurring in the load, the battery is isolated from the short circuit by the transformers T1 and T2. Thus, the battery is able to retain its voltage VIN which is input to the circuit. The circuit of FIG. 2 is disadvantageous, when compared to that of the present invention because, in FIG. 2, there is significant excess weight and size presented by the two transformers T1 and T2, this excess weight and size being detrimental to the use of the circuit on board a spacecraft.

In FIG. 3, in accordance with another form of circuitry employed in the prior art, the battery provides an input voltage VIN to the circuit, the circuit converting the voltage to a desired voltage level for operation of a load. A transistor Q3 is operated by a pulse-width modulator (not shown to simplify the drawing) which induces pulses of current to flow from the battery through an inductor L1. There results pulses of current passing through a diode D4 into a capacitor C2 to charge the capacitor to a suitable voltage level, and with sufficient electrical energy for operation of the load. The capacitor connects with the load via a fault isolator which protects the battery upon the occurrence of a short circuit in the load. The fault isolator is overly large and heavy, having a volume of approximately one cubic foot and weighing in the range of 10–15 pounds, for use on board a spacecraft. The circuitry of the invention avoids the use of a large heavy component such as the fault isolator of FIG. 3.

To facilitate a further comparison of the circuitry of the invention in FIG. 1 with the circuitry of the prior art in FIGS. 2 and 3, the polarity of the battery in each of the three circuits and the polarity of the load in each of the three circuits is shown. In each of the circuits of FIGS. 2 and 3, the positive terminal of the battery is shown above the negative terminal of the battery, this being in accordance with the excitation of the load wherein the positive terminal is shown above the negative terminal. However, in FIG. 1, the polarities of the battery terminals are shown reversed wherein the negative terminal is shown above the positive terminal. The reversal of the direction of current flow through the battery in FIG. 1, as compared to the direction of current flow through the load is a significant feature in the operation of the circuitry of the invention to protect the battery against short circuits which may occur within the load. This avoids the prior-art transformers of FIG. 2 and the prior-art fault isolator of FIG. 3 to provide a compact and light-weight circuit suitable for use on a spacecraft.

It is to be understood that the above described embodiment of the invention are illustrative only, and that modifications thereof may occur to those skilled in the art. Accordingly, this invention is not to be regarded as limited to the embodiment disclosed herein, but is to be limited only as defined by the appended claims.

What is claimed is:

1. A power regulator circuit for discharge of a battery, comprising:

a first circuit loop including input terminals for connection with the battery;

a second circuit loop including output terminals for connection with a load;

an inductor forming a first branch of said first loop and forming a first branch of said second loop;

unidirectional current means in said second loop for constraining electric current to flow in only one direction from said inductor to said output terminals, said first loop including a second branch interconnecting a terminal of said unidirectional current means via one of said input terminals to said battery, wherein said unidirectional current means blocks a flow of current from said battery through said second loop for a protection of said battery from a short circuit in said load; and means for repetitively gating current from said battery into said inductor.

2. A regulator circuit according to claim 1 wherein said second loop includes a capacitor connected across said output terminals, and said gating means provides for a pulse width modulation of current flowing from said battery into said inductor, said unidirectional current means enabling a charging of said capacitor with current from said inductor.

3. A regulator circuit according to claim 2 wherein inductance of said inductor and capacitance of said capacitor establish a resonant frequency, a frequency of said modulation being substantially greater than said resonant frequency to provide for a filtering of current pulses of said first loop to produce a substantially constant value of voltage across said capacitor.

4. A regulator circuit according to claim 1 wherein said gating means comprises a first field effect transistor (FET), said first FET being a branch of said first loop.

5. A regulator circuit according to claim 4 wherein said gating means further comprises a pulse width modulator for driving said first FET between states of conduction and nonconduction.

6. A regulator circuit according to claim 5 further comprising a current monitor connected to one of said output terminals for monitoring a current through said load, an output terminal of said monitor connecting with said modulator for directing said modulator to place said first FET in said state of nonconduction upon detection of excessive current flow in said load.

7. A regulator circuit according to claim 5 further comprising means for sensing voltage across said capacitor, said sensing means applying an output signal to said modulator for controlling a duty factor of said modulation for maintaining a substantially constant voltage across said capacitor.

8. A regulator circuit according to claim 5 wherein said unidirectional current means comprises a second FET disposed in said second loop between said inductor and one of said output terminals, said regulator circuit further comprising inverter means connecting between an output terminal of said modulator and a control terminal of said second FET for gating said second FET to provide states of conduction and nonconduction which are complementary to the states of conduction and nonconduction of said first FET.

9. A regulator circuit according to claim 8 wherein one of said input terminals and a terminal of said inductor and a terminal of said second FET connect with a common circuit node, and wherein another terminal of said inductor and a terminal of said first FET and one of said output terminals connect at a further common circuit node.

10. A regulator circuit according to claim 5 wherein said unidirectional current means comprises a diode.

11. A regulator circuit according to claim 1 further comprising a current monitor connected to one of said output terminals for monitoring a current in said load, said monitor connecting with said gating means to terminate a flow of current from said battery into said inductor upon an occurrence of an excessive current flow in said load.

* * * * *